Patented Jan. 7, 1936

2,026,517

UNITED STATES PATENT OFFICE 2,026,517

ANTIOXIDANT

Albert M. Clifford, Stow, Ohio, assignor to Wingfoot Corporation, Wilmington, Del., a corporation of Delaware No Drawing. Application March 11, 1932,
Serial No. 598,301

12 Claims. (Cl. 18—50)

My invention relates to antioxidant compositions for rubber.

It has been heretofore observed that many organic materials, notably those containing basic nitrogen or amino groups, have the effect when incorporated in rubber of very materially increasing the resistance of that material to the deleterious influences of air, sunlight and heat. The latter agencies exert a very marked influence on tires and other articles of rubber, particularly in that they hasten deterioration Although basic nitrogen-containing and amino-substituted organic materials effectively retard the action of weathering agencies under normal temperatures, when the stocks in which they are employed go into inner tubes for tires, hot water bottles or other articles which encounter high temperatures, the retardation of the weathering in question is itself decreased.

It is one of the objects of my invention to overcome these disadvantages.

Among other things, I have discovered that the substituted and unsubstituted amino derivatives of the biarylene oxides not only are excellent preservatives or age retarders at low temperatures, but also are unusually effective at high temperatures. Insofar as they may be regarded as amino ethers, it might, perhaps, be expected that the substituted and unsubstituted amino derivatives of the biarylene oxides would exhibit some age retarding properties, but the effect of the bond extending between and connecting the aryl groups has not heretofore been known. As hereinafter pointed out, the substituted and unsubstituted amino derivatives of the biarylene oxides, despite the presence of the bond in question, constitute desirable preservatives or age-retarders.

The substituted and unsubstituted amino derivatives of the biarylene oxides exhibit properties typical of aromatic ethers and have a typical ether constitution.

The unsubstituted 2,7 diamino biphenylene oxide, which in many respects is representative of the class of unsubstituted compounds, is conveniently prepared by first nitrating biphenylene oxide and then reducing the resulting 2,7 dinitro biphenylene oxide with iron filings and hydrochloric acid or ammonium chloride. The related 2-amino biphenylene oxide, melting at 194 degrees C., may be obtained by reducing the corresponding mono nitro biphenylene oxide. The compounds 2,7 diamino biphenylene oxide and 2-amino biphenylene oxide have, respectively, the structural formulæ

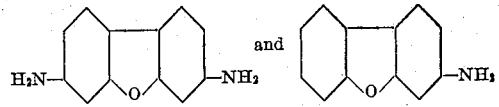

Obviously, these compounds are merely illustrative of the class of unsubstituted amino derivatives of the biarylene oxides.

The substituted amino derivatives of the biarylene oxides are derived from the corresponding unsubstituted compounds. They may be represented for purposes of illustration by the typical structural formulæ

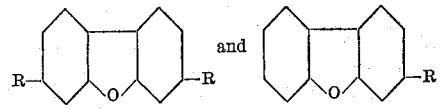

wherein the radical R comprises in each case a nitrogen atom directly connected to a nuclear carbon atom to which nitrogen atom is attached as a substituent at least one hydrocarbon or like group. The nitrogen atoms of the radicals R may be singly or doubly bonded, as the case may be, to the substituent hydrocarbon or like groups. Thus, for example, the class of substituted amino derivatives of the biarylene oxides embraces compounds of the type formulæ

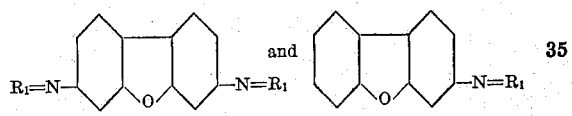

in which $R_1$ is a substituent hydrocarbon group, usually alkyl, and

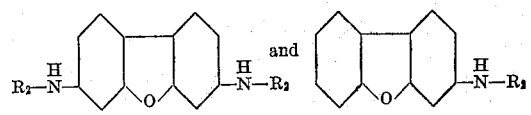

in which $R_2$ is a substituent hydrocarbon group. Also falling within the class of substituted amino derivatives of the biarylene oxides are compounds of the latter type in which $R_2$ contains an oxygen atom as well as carbon and hydrogen.

Substituted amino derivatives of the biarylene oxides in which the nitrogen atom of the radical R is doubly bonded in the manner referred to are exemplified by the mono- and di-alkylidene amino biphenylene oxides, of which 2,7 di(methylene amino) biphenylene oxide and 2(methylene amino) biphenylene oxide are typical. The latter compounds have, respectively, the structural formulæ

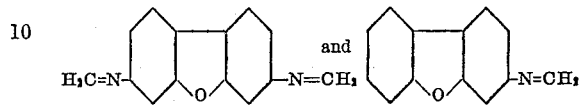

They may be made by reacting formaldehyde and the corresponding unsubstituted amino derivative of biphenylene oxide, using in the case of the former compound two mols of formaldehyde to one mol. of 2,7 diamino biphenylene oxide and, in the case of the latter, equimolar quantities of formaldehyde and 2-amino biphenylene oxide. In either instance, there may be employed in lieu of formaldehyde such other aldehydes as crotonaldehyde, acrolein and aldol. The radical $R_1$ in the type formulæ given above represents, of course, the hydrocarbon residue of the particular aldehyde employed in the reaction.

The class of substituted amino derivatives of biarylene oxides in which the nitrogen atoms of the radicals R are singly bonded to the attached hydrocarbon or like groups may be exemplified by such compounds as

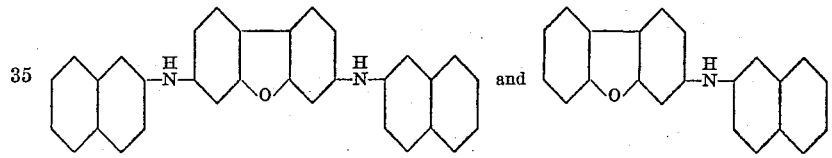

in which the beta naphthyl radicals correspond to the radicals $R_2$ in the type formulæ given above. Compounds of this class may be obtained by any one of several methods, of which perhaps the simplest involves merely interacting phenolic compounds such as alpha and beta naphthol with an unsubstituted amino derivative of the desired biarylene oxide. The compounds illustrated, respectively 2,7 di(beta naphthyl amino) biphenylene oxide and 2(beta naphthyl amino) biphenylene oxide, may thus be obtained by interacting beta naphthol and 2,7 diamino biphenylene oxide on one hand and beta naphthol and 2-amino biphenylene oxide on the other. Obviously, other phenolic compounds may be employed in place of alpha and beta naphthol.

Compounds rather closely related to substances of the type discussed immediately above but in which the radicals $R_2$ include an oxygen atom as well as merely carbon and hydrogen are the formic acid reaction products of the unsubstituted amino derivatives of the biarylene oxides. An example is 2(formyl amino) biphenylene oxide of the structural formula

which can readily be prepared by the interaction of equimolecular quantities of formic acid and 2-amino biphenylene oxide. It is to be understood in this connaction that 2(formyl amino) biphenylene oxide is representative of the formic acid reaction products of the unsubstituted amino derivatives of the biarylene oxides generally and, in a larger sense, of those substituted amino derivatives of the biarylene oxides in which the nitrogen atoms of the radicals R are singly bonded to the attached substituent groups.

The compounds to which the invention relates may be added with satisfactory results to substantially any of the ordinary rubber compounds.

Duplicate sets of test sheets containing as antioxidants 2,7 diamino biphenylene oxide, 2,7 di(methylene amino) biphenylene oxide, 2-amino biphenylene oxide and 2(formyl amino) biphenylene oxide have been prepared in accordance with Formulæ A and B, below. One set of test sheets prepared in accordance with Formula A was subjected to the familiar "low temperature" accelerated age test. A corresponding set of test sheets prepared in accordance with Formula B was subjected to the usual "high temperature" accelerated age test. The formulæ referred to are as follows:

*Formula A*

| | Parts |
|---|---|
| Extracted rubber | 100 |
| Zinc oxide | 5 |
| Sulphur | 3 |
| Hexamethylene tetramine | 1 |
| Stearic acid | 1.5 |
| Antioxidant | 1 |

*Formula B*

| | Parts |
|---|---|
| Smoked sheet | 100 |
| Carbon black | 0.6 |
| Zinc oxide | 92.6 |
| Sulphur | 3.5 |
| Iron oxide | 0.8 |
| Diphenylguanidine | 0.7 |
| Antioxidant | 5.0 |

The following results were obtained:

| Cure | Original | | | | Aged | | | | % Inc. wt. |
|---|---|---|---|---|---|---|---|---|---|
| | Modulus kgs./cm.² | | Tens. | Elong. | Modulus kgs./cm.² | | Tens. | Elong. | |
| | 500% | 700% | | | 500% | 700% | | | |
| Low Temperature Tests | | | | | | | | | |
| *2,7 Diamino bi-phenylene oxide* | | | | | | | | | |
| 35/285 | 20 | 75 | 156 | 830 | 24 | 89 | 144 | 785 | ------ |
| 50 | 28 | 108 | 180 | 790 | 33 | 131 | 173 | 750 | ------ |
| 70 | 37 | 149 | 187 | 740 | 40 | 159 | 181 | 725 | ------ |
| *2,7 (Dimethylene amino) bi-phenylene oxide* | | | | | | | | | |
| 35/285 | 18 | 62 | 123 | 815 | 15 | 60 | 116 | 820 | .31 |
| 50 | 24 | 96 | 143 | 865 | 24 | 100 | 112 | 730 | .44 |
| 70 | 29 | 118 | 156 | 745 | 32 | 130 | 130 | 700 | .63 |
| *2-Amino bi-phenylene oxide* | | | | | | | | | |
| 35/285 | 16 | 48 | 128 | 870 | 16 | 27 | 99 | 800 | .30 |
| 50 | 21 | 78 | 154 | 815 | 23 | 44 | 126 | 755 | .33 |
| 70 | 32 | 120 | 200 | 785 | 29 | ------ | 42 | 570 | ------ |

2 (Formyl amino) bi-phenylene oxide

| 35/285 | 13 | 40 | 86 | 840 | 16 | 49 | 92 | 810 | |
| 50 | 18 | 62 | 134 | 830 | 20 | 68 | 92 | 750 | .83 |
| 70 | 24 | 90 | 158 | 795 | | | 18 | 340 | 1.03 |

High Temperature Tests

| | 300% | 500% | | | 300% | 500% | | | |

2.7 Diamino bi-phenylene oxide

| 35/285 | 37 | 105 | 182 | 630 | 44 | 110 | 102 | 505 | |
| 50 | 41 | 115 | 200 | 635 | 52 | 115 | 120 | 510 | |
| 70 | 46 | 125 | 230 | 650 | 64 | | 110 | 435 | |

2.7 (Dimethylene amino) bi-phenylene oxide

| 35/285 | 40 | 118 | 203 | 635 | 32 | 78 | 118 | 520 | |
| 50 | 49 | 144 | 216 | 600 | 37 | 88 | 144 | 530 | |
| 70 | 53 | 148 | 247 | 630 | 44 | | 148 | 495 | |

2-Amino bi-phenylene oxide

| 35/285 | 26 | 76 | 158 | 655 | 21 | 48 | 60 | 585 | |
| 50 | 28 | 82 | 196 | 690 | 25 | 59 | 80 | 595 | |
| 70 | 32 | 91 | 208 | 690 | 30 | 70 | 95 | 590 | |

2 (Formyl amino) bi-phenylene oxide

| 35/285 | 28 | 76 | 112 | 590 | 8 | 20 | 22 | 535 | |
| 50 | 31 | 86 | 154 | 635 | 11 | | 22 | 490 | |
| 70 | 37 | 98 | 176 | 640 | Too soft. | | | | |

All of the antioxidants described above are substantially non-toxic in nature and substantially non-odorous. They may therefore be employed in rubber factories without unusual precautions to prevent deleterious effects upon the workmen employed in handling them. The basic materials from which they are manufactured are also comparatively inexpensive to obtain. The reactions involved in their preparation are simple and the resultant products are obtained in a state of sufficient purity to permit being used in rubber without any particular additional treatment. They blend readily with the rubber compounds to produce stock of high uniformity. All of the materials herein disclosed are accordingly highly desirable as commercial antioxidants.

From the above considerations, it will be apparent that the invention includes a large number of compositions and is not limited to the specific details herein specifically given. It will accordingly be understood that it is intended and desired to embrace within the scope of this invention such modifications as may be necessary to adapt it to varying conditions and uses. It is intended that the patent shall cover, by suitable expression in the appended claims, whatever features of patentable novelty reside in the invention.

What I claim is:

1. A method of preserving rubber which comprises treating the same with the reaction product of an amino derivative of a biphenylene oxide and an aliphatic aldehyde.

2. A method of preserving rubber which comprises treating the same with the reaction product of an amino derivative of a biphenylene oxide and an aldehyde selected from the group consisting of formaldehyde, crotonaldehyde, acrolein and aldol.

3. A method of preserving rubber which comprises vulcanizing the same in the presence of the reaction product of an amino derivative of a biphenylene oxide and formaldehyde.

4. A method of preserving rubber which comprises treating the same with a material embodying the structural formula

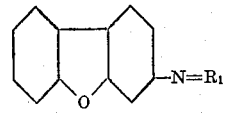

where $R_1$ is an aliphatic aldehyde residue.

5. A method of preserving rubber which comprises vulcanizing the same in the presence of a material embodying the structural formula

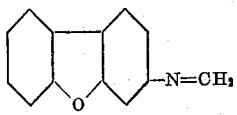

6. A method of preserving rubber which comprises vulcanizing the same in the presence of a material having the structural formula

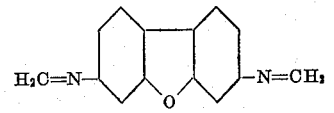

7. A rubber product which has been treated with the reaction product of an amino derivative of a biphenylene oxide and an aliphatic aldehyde.

8. A rubber product which has been treated with the reaction product of an amino derivative of a biphenylene oxide and an aldehyde selected from the group consisting of formaldehyde, crotonaldehyde, acrolein and aldol.

9. A rubber product which has been vulcanized in the presence of the reaction product of an amino derivative of a biphenylene oxide and formaldehyde.

10. A rubber product which has been treated with a material embodying the structural formula

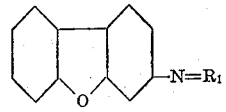

where $R_1$ is an aliphatic aldehyde residue.

11. A rubber product which has been vulcanized in the presence of a material embodying the structural formula

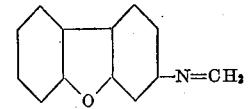

12. A rubber product which has been vulcanized in the presence of a material embodying the structural formula:

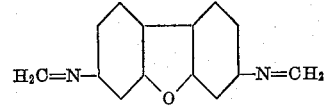

ALBERT M. CLIFFORD.